United States Patent Office 3,723,333
Patented Mar. 27, 1973

3,723,333
METHOD FOR INHIBITING CORROSION AND MINERAL DEPOSITS IN WATER SYSTEMS
Helmut von Freyhold, Dusseldorf-Oberkassel, Germany, assignor to Henkel & Cie G.m.b.H., Dusseldorf-Holthausen, Germany
No Drawing. Continuation of abandoned application Ser. No. 821,487, May 2, 1969. This application July 14, 1971, Ser. No. 162,649
Claims priority, application Germany, May 11, 1968, P 17 67 454.3
Int. Cl. C23f 11/18
U.S. Cl. 252—175　　　　　　　　　　15 Claims

ABSTRACT OF THE DISCLOSURE

Addition to a water system a composition comprising a compound having the following formula

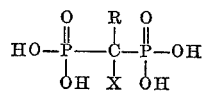

wherein
X is OH or $NH_2$, and
R is alkyl radical of 1 to 5 carbon atoms;

and a water-soluble, complex-forming compound which contains at least one phosphonate or N-dimethylenephosphonic acid group. Water-soluble salts of the first-mentioned compound can also be used. Relative amounts of the compounds in the composition varies from a molar ratio of from 1:3 to 3:1, respectively. Amount of the composition to be used in water may vary from 1 mg./liter and up to 150% of the quantity of composition necessary for substantially completely converting into complexes the substances imparting hardness to the water.

PRIOR APPLICATION

This application is a streamlined continuation of co-pending, commonly assigned application Ser. No. 821,487, filed May 2, 1969, now abandoned.

PRIOR ART

Readily or sparingly soluble polymeric phosphates, such as tetrasodium pyrophosphate, pentasodium tripolyphosphate or hexametaphosphate, are generally pentasodium tripolyphosphate preventing corrosion and mineral depositions. The polymeric phosphates are usually added in less than the stoichiometric amounts. Stoichiometric amounts may, of course, be used in order to completely bind, in the form of complexes, the substances, such as the alkaline earth ions which impart hardness to water. The polymeric phosphates may also be used in order to solubilize precipitated complexes.

One disadvantage of these polymeric phosphates is their low resistance to hydrolysis, i.e., the conversion to orthophosphates, which takes place relatively quickly at elevated temperatures. For instance, in the temperature region above 60° C., where the danger of mineral deposition is particularly great, the activity of the otherwise very suitable polymeric phosphates is, at least temporarily, almost completely inhibited.

It is also known that certain phosphonic acids, such as for example, hydroxyethane-1, 1-diphosphonic acid or amino tri(methylenephosphonic acid), are good complex-forming compounds. Such compounds do not hydrolyze at the temperature in question and may also be used as complex-forming compounds in less than the stoichiometric amounts. Since these compounds have no corrosion-inhibiting effect, however, they hinder any formation of a protective layer, which again can give rise to corrosion by carbon dioxide or oxygen. If other inhibitors having corrosion-inhibiting effect are added, such as potassium, sodium or ammonium orthophosphates, and/or water-soluble zinc salts, satisfactory results are not obtained, since these additives easily preciptate under the operating conditions.

OBJECTS OF THE INVENTION

It is an object of the present invention to provide a method for treating water in order to inhibit corrosion and mineral deposition.

Another object of the invention is the treatment of water systems for inhibiting formation of boiler scale.

A further object of this invention is the treatment of a water system to inhibit corrosion and mineral deposition with a composition comprising a compound of the following formula:

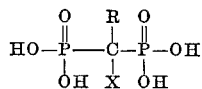

and a water-soluble, complex-forming compound which contains at least one phosphonate or N-dimethylenephosphonic acid group. X in above formula is OH or $NH_2$ and R is an alkyl radical of from 1 to 5 carbon atoms. Amount of the compounds in said composition varies from a mole ratio of 1:3 to 3:1.

A still further object of this invention is the treatment of a water system to inhibit corrosion and mineral deposition with a composition which does not form precipitates under operating conditions.

DESCRIPTION OF THE INVENTION

The present invention relates to the treatment of hot water systems for prevention of corrosion and mineral depositions, especially, for prevention of deposition of boiler scale.

The herein method described for the prevention of corrosion and mineral deposition in a water system comprises adding to the water used in the system a compound of the Formula I

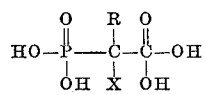　　　　　　　　　(I)

in which

X is OH or $NH_2$, and
R is an alkyl radical with 1 to 5 carbon atoms;

and a water-soluble, complex-forming compound which contains at least one N-dimethylenephosphonic acid or -phosphonate group. The compound of Formula I and the water-soluble, complex-forming compound are used in the molar ratio of 1:3 to 3:1, and in an amount of from 1 mg. per liter of water up to 1½ times the quantity which is necessary for substantially completely converting into complexes the substances imparting hardness to the water system. Water-soluble salts of the compound of Formula I are also suitable as substitutes thereof.

Examples of compounds of Formula I are hydroxyalkane-1, 1-diphosphonic acids such as hydroxyethane-, hydroxypropane-, hydroxybutane-, hydroxypentane- and hydroxyhexane-1,1-diphosphonic acids; or aminoethane-, aminopropane-, aminobutane-, aminopentane- and aminohexane-1,1-diphosphonic acids. Instead of the acids, the water-soluble salts, preferably the alkali metal salts, may also be used. The sodium and potassium salts, which can be easily prepared, are especially suitable.

Water-soluble complex-forming compounds, which contain at least one N-dimethylenephosphonic acid group, are compounds of Formula II

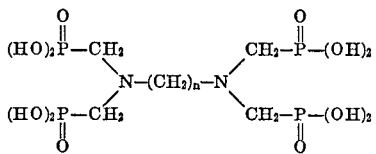

in which, n represents an integer of from 1 to 6, and preferably from 4 to 6. Of this group, hexamethylenediaminotetraphosphonic acid is particularly suitable. Instead of the phosphonic acids, the water-soluble salts, such as the sodium and potassium salts, may also be used. In particular, however, preferred water-soluble, complex-forming compounds are those which correspond to Formula III

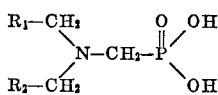

in which, $R_1$ and $R_2$ which may be same or different, represent a ($-PO_3H_2$) group, or the formula

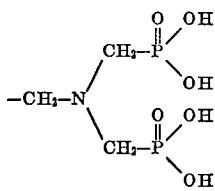

Examples of above-mentioned compounds are aminotri(methylenephosphonic acid), ethylenediaminotetra-(methylenephosphonic acid), and diethylenetriaminopenta(methylenephosphonic acid). Instead of the acids, the corresponding water-soluble salts, such as sodium and potassium salts, may also be used. Further, mixtures of the various compounds mentioned above may also be used, if desired.

A preferred embodiment of the process employs mixtures of hydroxyethane-1,1-diphosphonic acid and aminotri(methylenephosphonic acid), or their water-soluble salts, as complex-forming compounds, the said components being present in the molar ratio of 1:3 to 3:1. The addition to water is effected in the previously stated amounts of from 1 mg. per liter to 1½ times the amount which is necessary for the complete formation of the complexes of the hardness-imparting substances present in the system. In practice, quantities of 2 to 20 mg. per liter are generally used.

Other conventional inhibitors which can be added to hot water systems are water-soluble orthophosphates, of the type previously mentioned, such as mono-, di- or tri-alkali metal phosphates. In many cases, it is advantageous to use sodium dihydrogen phosphate ($NaH_2PO_4$). Furthermore, water-soluble zinc salts, such as zinc sulphate or zinc nitrate, may be added instead of the orthophosphates, however, preferably together with the alkali orthophosphates. Further inhibitors, which may also be used if desired, are alkali metal nitrites, such as potassium or, especially sodium nitrite. An addition of alkali metal silicates, such as potassium or sodium silicate, may also be made. The inhibitors are added in amounts from 0.5 to 500 mg., and preferably from 1 to 100 mg. per liter. These inhibitors may be added in the solid or solution form. There is no difficulty in adding these products while simultaneously regulating pH of the water which is being treated in case this is desired or necessary, either by further addition of alkali or by a choice of a suitable mono-, di- or tri-alkali metal phosphate.

The advantages of the method reside in that no hydrolysis of the complex-forming compounds occurs and therefore, the agents are active for a very long duration. Furthermore, the combination with the other components and the complex-forming compounds enables the desired formation of a protective layer to take place. The premature precipitation of the inhibitors, such as phosphates and zinc salts, in the pH range from 7 to 10, does not take place.

In the following examples, the percentages are on weight basis, in absence of other designation.

EXAMPLE I

Iron sheets of dimensions 100 x 50 x 0.5 mm. were suspended in 1 liter of water containing the particular additive, amount of which is indicated in the table below. The water had a total hardness of 14.3° (German hardness), pH of 6.9, carbonate hardness of 8.7° (German hardness), oxygen at 5.33 mg. per liter, corrosive carbonic acid at 8.44 mg. per liter, and chloride ions at about 190 mg. per liter. The temperature was maintained at 80° C. The solution which was renewed every 6 hours, was moderately agitated by stirring. After 24 hours, the sheets were examined and their deposit of rust and change in weight were compared. The results are tabulated below: The abbreviations used are ATMP for aminotri-(methylenephosphonic acid), and HEDP for hydroxyethane-1,1-diphosphonic acid in the form of its disodium salt. The experiments were repeated several times.

| No. of ex. | Amount, mg./liter | Additive | Result |
|---|---|---|---|
| 1 | 500 | $Na_2HPO_4$ | With decreasing phosphate concentration during the experiment, there was increasing corrosion, pitting, considerable erosion. Loss in wt., 80 to 160 mg./100 cm.² |
| 2 | 6 | ATMP | Erosion of the metal without rust deposition. Loss in wt., 20 to 60 mg./100 cm.². |
| 3 | 60 | ATMP | Considerable erosion without rust deposition. Loss in wt., >100 mg./100 cm.². |
| 4 | 10 | HEDP | Erosion of the metal without rust deposition. Loss in wt., 20 to 60 mg./100 cm.². |
| 5 | 100 | HEDP | Considerable erosion without rust deposition. Loss in wt., >100 mg./100 cm.². |
| 6 | 50 / 50 | ATMP / HEDP | Considerable erosion without rust deposition. Loss in wt., about 100 mg./100 cm.². |
| 7 | 40 / 4 | $Na_2HPO_4$ / ATMP | No surface corrosion. Change in weight of the sheets, <0.5 mg./100 cm.². Turbid solution. |
| 8 | 40 / 6 | $Na_2HPO_4$ / HEDP | No surface corrosion. Change in weight of the sheets, <0.5 mg./100 cm.². Turbid solution. |
| 9 | 40 / 2 / 2 | $Na_2HPO_4$ / HEDP / ATMP | No surface corrosion. Change in weight of the sheets, <0.5 mg./100 cm.². No turbidity of the solution even with renewed solution which had carbonate hardness of 10° and pH of 9. No separation of scale on the sheet. |
| 10 | 40 / 2 / 2 / 1 | $Na_2HPO_4$ / HEDP / ATMP / Zinc nitrate | No corrosion. Change in weight of the sheets, <0.5 mg./100 cm.². No turbidity in the solution. |

EXAMPLE 2

To each cubic meter of water present in a hot water system maintained at temperature 80° C. and having a total hardness of 30° (German hardness), 1 kg. of a solution was added of the following composition.

|  | Percent |
|---|---|
| $Na_2HPO_4 \cdot 2H_2O$ | 44 |
| HEDP (free acid) | 3.6 |
| ATMP | 3.5 |
| Zinc nitrate | 2 |
| Water | 46.9 |

During this treatment, the pH value of the water was adjusted to 9.5. No corrosion occurred in either the galvanized pipe system, the heating unit, or in the non-ferrous metal valves. Furthermore, no turbidity of the water was observed during a period of 6 weeks.

EXAMPLE 3

To each cubic meter of water of Example 2 was added 1.2 kg. of a solution of the following composition:

|  | Percent |
|---|---|
| $NaH_2PO_4 \cdot 2H_2O$ | 25 |
| HEDP (free acid) | 9 |
| ATMP | 9 |
| Zinc nitrate | 2 |
| Water | 55 |

Prior to the treatment, the hot water system was strongly scaled, so that reduction of the heating efficiency and boiling noises in the boiler occurred. After a treatment time of 2 weeks, the boiling noises were eliminated and full heating efficiency was restored. Inspection of the pipe system showed that it was completely free from scale. Formation of a sludge was not observed, and there was just a little corrosion in the entire system, including the valve.

EXAMPLE 4

120 g. of the solution described in Example 2 was added per cubic meter of the water in a cooling circuit exposed to evaporation losses. This water had a total hardness of 20.3° (German hardness), carbonate hardness of 14° (German hardness), corrosive carbonic acid at 4.5 mg. per liter, oxygen at 2.0 mg. per liter, and chloride ions at 260 mg. per liter. During the 6-week test period, no new encrustations were formed. After each 14 days, a small amount of sludge had to be removed from the system (caused by evaporation losses of water).

Various modifications of the herein described method for inhibiting corrosion and mineral deposition in a water system may be made without departing from the spirit and the scope thereof, and it is to be understood that the invention is to be limited only as defined by the appended claims.

I claim:

1. A method for inhibiting corrosion and mineral deposition in a water system comprising the steps of adding to said water system from 1 mg./liter of said water up to 1½ times the quantity which is necessary for substantially completely converting into complexes the substance imparting hardness to said water, of a composition comprising a first compound selected from the group consisting of a diphosphonic compound of the formula

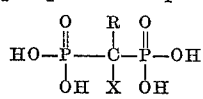

wherein X is OH or $NH_2$, and R is an alkyl of 1 to 5 carbon atoms, water soluble salts of said diphosphonic compound, and a mixture of said diphosphonic compound and said water-soluble salts thereof; and a second compound selected from the group consisting of water-soluble, complex forming compounds containing at least one radical selected from the group consisting of phosphonates and N-dimethylenephosphonic acid radicals, water-soluble salts thereof and mixtures of said compounds and their water soluble salts; said first and second compounds are present in said composition in molar ratio of from 1:3 to 3:1 and from 0.5 to 500 mg./liter of water of an inhibitor selected from the group consisting of (A) water-soluble orthophosphates, water-soluble zinc salts and mixtures thereof and (B) alkali metal silicates, alkali metal nitrites, and mixtures thereof.

2. Method of claim 1 wherein said second compound is selected from the group consisting of compounds having the following formulas:

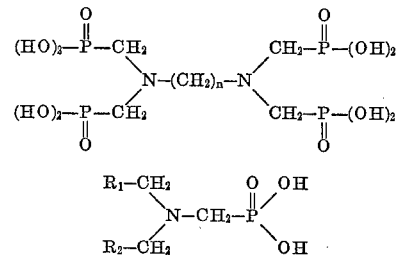

wherein $n$ represents an integer from 1 to 6; and $R_1$ and $R_2$, which can be the same or different, represent a radical selected from the group consisting of ($-PO_3H_2$) and

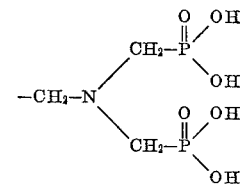

3. Method of claim 2 wherein $n$ is an integer from 4 to 6.

4. Method of claim 2 wherein amount of said composition added to said water is from 2 to 20 mg./liter.

5. Method of claim 2 wherein said composition is added to said waiter in the amount of 2 to 20 mg./liter.

6. Method of claim 2 wherein said composition also includes 1 to 100 mg./liter of water of an inhibitor selected from the group consisting of disodium hydrogen phosphate, zinc sulfate, zinc nitrate, potassium nitrite, sodium nitrite, and mixtures thereof.

7. The method of claim 1 wherein the first compound is selected from the group consisting of 1-hydroxyethane-1,1-diphosphonic acid, water-soluble salts thereof and mixtures of said acid and its water-soluble salts and the second compound is selected from the group consisting of amino tri[methylene phosphonic acid], water soluble salts thereof and mixtures of said acid and its water soluble salts.

8. Method of claim 1 wherein said inhibitor is present in an amount of 1 to 100 mg./liter of water.

9. A composition for inhibiting corrosion and mineral deposition in water systems comprising a first compound selected from the group consisting of a diphosphonic acid of formula

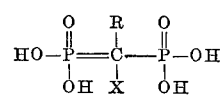

wherein X is selected from the group consisting of OH and $NH_2$ and R is an alkyl of 1 to 5 carbon atoms, water soluble salts thereof and mixtures of said acid and its water soluble salts and a second compound selected from the group consisting of water-soluble, complex forming compounds containing at least one member selected from the group consisting of phosphonates and N-dimethylenephosphonic acid radicals, water soluble salts thereof and mixtures of said compounds and their water-soluble salts; said first and second compounds are present in said composition in molar ratio of from 1:3 to 3:1; and an inhibitor selected from the group consisting of (A) water-soluble orthophosphates, water-soluble zinc salts, and mixtures thereof and (B) alkali metal silicates, alkali metal nitrites, and mixtures thereof.

10. A composition for inhibiting corrosion and mineral deposition in water systems comprising a first compound selected from the group consisting of 1-hydroxyethane-1,1-diphosphonic acid, water-soluble salts thereof and mixtures of said acid and its water-soluble salts; a second compound selected from the group consisting of amino tri[methylene phosphonic acid], water-soluble salts thereof and mixtures of said acid and its water-soluble salts, said first and second compounds being present in said composition in molar ratio of 1:3 to 3:1; and an inhibitor selected from the group consisting of (A) water-soluble orthophosphates, water-soluble zinc salts and mixtures thereof and (B) alkali metal silicates, alkali metal nitrites and mixtures thereof.

11. A composition for inhibiting corrosion and mineral deposition in water systems comprising a first compound selected from the group consisting of 1-hydroxyethane-1,1-diphosphonic acid, water-soluble salts thereof and mixtures of said acid and its water-soluble salts, a second compound selected from the group consisting of amino tri(methylenephosphonic acid), water-soluble salts thereof and mixtures of said acid and its water-soluble salts and as a third compound disodium hydrogen phosphate, said first and second compounds being present in said composition in molar ratio of from 1:3 to 3:1.

12. A composition of claim 11 which includes an inhibitor selected from the group consisting of water-soluble orthophosphates, water-soluble zinc salts and mixtures thereof.

13. A method for inhibiting corrosion and mineral deposition in a water system comprising the steps of adding to the water system from 1 mg./liter of said water up to 1½ times the quantity which is necessary for substantially completely converting into complexes the substances imparting hardness to water, of a composition comprising a first compound selected from the group consisting of 1-hydroxyethane - 1,1 - diphosphonic acid, water-soluble salts thereof and mixtures of said acid and its water-soluble salts; a second compound selected from the group consisting of amino tri[methylene phosphonic acid], water soluble salts thereof and mixtures of said acid and its water soluble salts, said first and second compounds being present in said composition in molar ratio of 1:3 to 3:1; and from 0.5 to 500 mg./liter of water of an inhibitor selected from the group consisting of (A) water-soluble orthophosphates, water-soluble zinc salts and mixtures thereof and (B) alkali metal silicates, alkali metal nitrites, and mixtures thereof.

14. The method of claim 13 wherein the amount of said composition added to said water is 2 to 20 mg./liter.

15. The method of claim 14 wherein the composition includes 1 to 100 mg. of disodium hydrogen phosphate.

References Cited
UNITED STATES PATENTS

| | | | |
|---|---|---|---|
| 3,214,454 | 10/1965 | Blaser | 252—180 X |
| 3,234,124 | 2/1966 | Irani | 252—175 X |
| 3,303,139 | 2/1967 | Blaser | 252—180 |
| 3,336,221 | 8/1967 | Ralston | 210—58 |
| 3,431,217 | 3/1969 | Hwa | 252—389 |
| 3,451,939 | 6/1969 | Ralston | 252—181 |
| 3,505,238 | 4/1970 | Liddell | 252—180 |

ROBERT F. BURNETT, Primary Examiner

M. E. McCAMISH, Assistant Examiner

U.S. Cl. X.R.

21—2.7; 210—58, 59; 252—82, 87, 180